Patented July 3, 1951

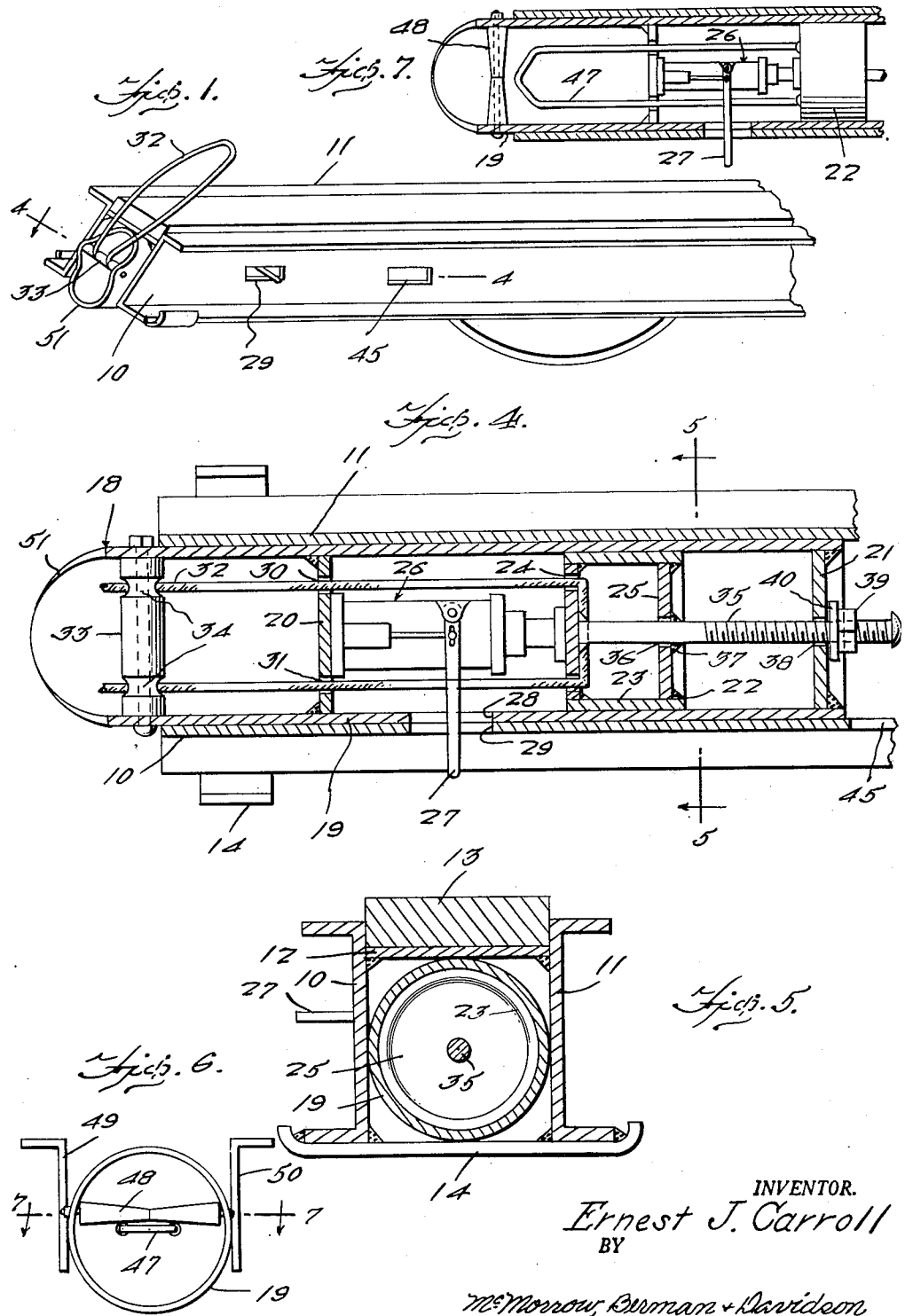

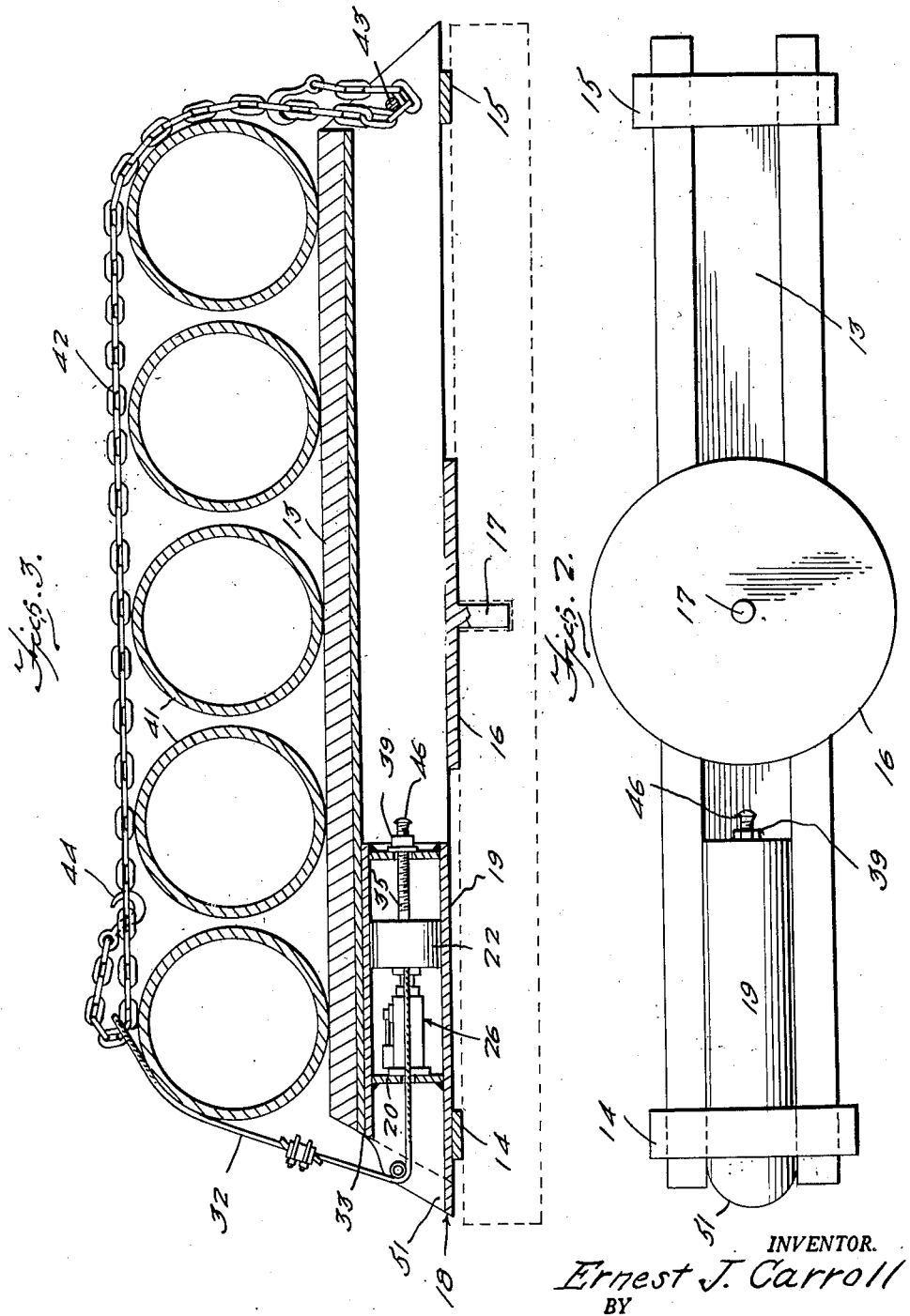

2,559,185

UNITED STATES PATENT OFFICE 2,559,185

LOAD BINDER

Ernest J. Carroll, Ada, Okla.

Application April 26, 1949, Serial No. 89,730

2 Claims. (Cl. 280—179)

This invention relates to load binders, and more particularly to a jack-operated binder for tightening a binding chain or cable about a vehicle-carried load.

It is among the objects of the invention to provide a jack-operated load binder or chain tightener which can be simply and easily mounted on various types of load-carrying vehicles, such as railway flat cars, automotive trucks and trailers, log wagons and trailer dollys for hauling heavy equipment, which is jack operated to chain-tightening condition and releasably locked in such condition, and which is simple and durable in construction, economical to manufacture, and easy to operate.

Other objects and advantages will become apparent from a consideration of the following description and the appended claims in conjunction with the accompanying drawings, wherein:

Figure 1 is a perspective view of a fragmentary portion of a load-carrying bolster of a vehicle showing a load binder illustrative of the invention operatively installed in the bolster;

Figure 2 is a bottom plan view of the bolster and load binder illustrated in Figure 1;

Figure 3 is a longitudinal, medial cross-section of the bolster with a load supported thereon and bound to the bolster by a binding chain and the load binder of the invention;

Figure 4 is a longitudinal cross-section on the line 4—4 of Figure 1;

Figure 5 is a transverse cross-section on the line 5—5 of Figure 4;

Figure 6 is an end elevation of a somewhat modified form of load binder; and

Figure 7 is a longitudinal cross-section on the line 7—7 of Figure 6.

With continued reference to the drawings, the vehicle bolster, as illustrated, comprises two spaced-apart, substantially parallel channel iron side members 10 and 11 each having its flanges directed away from the other side member, a top plate 12 disposed between the side members 10 and 11 near their upper edges and welded along its opposite longitudinal edges to the side members, a load-supporting plank 13 supported on the top surface of the top plate 12 between the side members 10 and 11 at the upper edges of the latter, transverse ties 14 and 15 extending transversely beneath the side members 10 and 11 near respectively opposite ends of the bolster and welded to the side members and to the bottom flanges of the latter, and a circular, fifth-wheel plate 16 secured to the bottom surfaces of the side members of the bolster substantially concentric with the mid-length location of the bolster.

A pivot pin 17 depends from the center of the fifth-wheel plate 16 for engagement in a pivot pin socket provided in the bolster-supporting vehicle structure.

The load-binding unit is generally indicated at 18 and comprises an elongated, tubular housing 19 of a diameter to fit closely between the channel iron side members 10 and 11 of the bolster. Two transverse partitions 20 and 21 are secured in the housing 19, the partition 21 being disposed near the inner end of the housing, and the partition 20 between the outer end of the housing and the mid-length location of the latter, but relatively near the outer end of the housing. These partitions are preferably welded into the housing by marginal welds at the outer sides of the partitions.

The housing 19 may be of either rectangular or circular cross-sectional shape, as may be desired.

A piston 22 is slidable in the housing 19, and includes an annular side wall 23, and two spaced-apart end walls 24 and 25 received in the annular side wall 23 at respectively opposite ends of the latter and secured in the side wall by marginal welds.

A hydraulic jack, generally indicated at 26, which may be of any suitable conventional or desired construction, is interposed between the end wall 20 near the outer end of the housing 19 and the adjacent end wall 24 of the piston 22. An operating handle 27 extends from the jack through registering slots 28 and 29 in the housing 19, and the channel iron side member 10, so that the jack can be manually operated to forcibly move the piston 22 away from the partition 20 in the housing.

The partition 20 is provided with two apertures 30 and 31 therethrough disposed at respectively opposite sides of the jack 26, and a chain-engaging loop 32 has its opposite sides slidably extending through the apertures 30 and 31 respectively, and connected to the adjacent end wall 24 of the piston.

The loop 32 may be formed of a piece of flexible cable or of a rigid iron rod, depending upon the type of vehicle to which the load binder is to be applied and the kind of load to be secured to the vehicle.

In the case of a flexible loop, as illustrated in Figures 1 and 4, the ends of the cable are brought into the interior of the piston 22 between the end walls 24 and 25, and the interior of the piston may be utilized as a babbitt chamber to hold a body of babbitt or similar material by means of which the cable ends are securely fastened in the piston.

A roller 33 is transversely journaled in the housing 19 at the outer end of the housing, and is provided with spaced-apart annular grooves 34 therein which receive the sides of the loop 32 passing under the roller 33, as illustrated in Figure 1.

A screw shaft 35 is secured at one end to the piston end wall 24 concentrically of the latter and extends through a central aperture 36 in the piston end wall 25, being secured to the end wall 25 by a weld joint 37, and extends through a central aperture 38 in the transverse housing partition 21. A nut 39 is threaded on the screw shaft 35 at the outer side of the partition 21, and a heavy washer 40 is interposed between this nut and the partition.

In the use of the device, as illustrated in Figure 3, wherein a group of load members, such as heavy pipe sections 41, are shown as supported in side-by-side relationship on the load-supporting plank 13 of the bolster, a load-binding chain 42 is passed around a pin 43 extending transversely through the bolster at the end of the latter opposite that in which the load-binding unit 18 is received. The chain passes over the load members 41 and through the loop 32 to which it is secured by the hook 44 or by a loop formed at the corresponding end of the chain by engaging the hook 44 in the chain at a location spaced from the corresponding end of the loop 32. When the chain is secured to the loop 32, the jack 26 will be in its collapsed condition, and the piston 22 as near the partition 20 as the collapsed length of the jack will permit. The chain is attached to the loop 32 so as to leave no unnecessary slack in the chain, and the jack 26 is then operated by the jack handle 27 to force the piston 22 away from the partition 20 and pull a portion of the loop 32 into the housing 19 around the roller 33. When the desired tension has been placed on the chain 42, operation of the jack is terminated, and nut 39 is threaded down on screw shaft 35 until the washer 40 is clamped between the nut and the transverse partition 21 to lock the piston 22 in the position to which it has been moved by the jack. Access to the nut is had through an aperture 45 in the bolster side member 10. When it is desired to release the chain 42, the jack is operated sufficiently to remove the pressure on the nut 34 and the nut is then threaded back to the outer end of the screw shaft 35, this end of the screw shaft being peened or burred, as indicated at 46, to prevent loss of the nut, and the jack 26 is then released so that it will collapse, permitting the piston 22 to move toward the partition 20 and loosen the loop 32.

In the modified arrangement illustrated in Figures 6 and 7, the loop 47 is formed of a rigid iron rod, the ends of which are attached to the end wall 21 of the piston, and the roller 48 is tapered from its opposite ends toward its midlength location to receive a chain or cable and center such chain or cable relative to the loop 47. In this arrangement, suitable angle iron brackets 49 and 50 extending lengthwise of the housing 19 may be substituted for the bolster construction, hereinabove described, for attachment of the load-binder unit to a flat surface, such as the floor of a flat-car, truck or trailer.

Preferably, the outer end of the tubular housing 19 is inclined at an angle to the longitudinal center-line of the housing, so that the bottom portion of the housing projects outwardly somewhat beyond the top portion of the housing, as indicated at 51 in Figures 1, 3 and 4.

Where the rigid loop 47 is used, the loop is made of such length that its outer end does not, at any time, project outwardly beyond the roller 48, the loop, when fully extended, preferably terminating at a location spaced inwardly of the roller, as illustrated in Figure 7.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning the range of equivalency of the claims are, therefore, intended to be embraced therein.

What is claimed is:

1. A load-binder device comprising a tubular housing attachable to a load-carrying vehicle to extend transversely of the vehicle, two transverse partitions in said housing disposed near respectively opposite ends of the latter, a hollow piston slidably mounted in said housing and having spaced-apart end walls, a manually-operated jack interposed between said piston and one of said transverse partitions for forcibly moving said piston in one direction in said housing, said one transverse partition having two apertures therein at respectively opposite sides of said jack, a chain-engaging loop extending through said partition apertures and out of said housing at one end of the latter, said loop being secured at one end to said piston and movable inwardly of said housing upon movement of said piston by said jack, a roller transversely journaled in said housing near the outer side of said one partition and providing a sheave for said loop, the other of said partitions having a central aperture therein, a screw shaft secured at one end to said piston concentrically of the latter and extending through the central aperture in said other partition, means including a nut threaded on said screw shaft to bear against the outer side of said other partition to releasably lock said piston in positions to which it is moved by said jack, and chain anchoring means carried by said vehicle at the side of the latter opposite said housing, said anchoring means and said chain engaging loop being effective to tighten a load binding chain extending transversely of the vehicle and secured to said anchoring means and said loop at respectively opposite sides of the vehicle.

2. A load binder device comprising a tubular housing attachable to a load carrying vehicle to extend transversely of the vehicle, two transverse partitions in said housing disposed near respectively opposite ends of the latter, a piston slidable in said housing, a manually operated jack interposed between said piston and one of said transverse partitions for forcibly moving said piston in one direction in said housing, said one transverse partition having two apertures therein at respectively opposite sides of said jack, a chain engaging loop extending through the partition apertures and out of said housing at the adjacent end of the latter, said loop being secured at one end to said piston and movable inwardly of said housing upon movement of said piston by said jack, a roller journaled in said housing nearest said one end of the housing and providing a sheave for said loop, and chain anchoring means carried by said vehicle at the side of the latter opposite said housing, said anchoring means and said loop being effective to tighten a load binding chain extending transversely across the vehicle and connected to said anchoring means and said loop.

ERNEST J. CARROLL.

REFERENCES CITED

The following references are of record in the file of this patent:

UNITED STATES PATENTS

| Number | Name | Date |
| --- | --- | --- |
| 1,245,607 | Maxwell | Nov. 6, 1917 |